(12) United States Patent
Chen et al.

(10) Patent No.: US 11,908,044 B2
(45) Date of Patent: Feb. 20, 2024

(54) SYSTEMS AND METHODS FOR COMPUTED TOMOGRAPHY IMAGE RECONSTRUCTION

(71) Applicants: GE Precision Healthcare LLC, Milwaukee, WI (US); Wisconsin Alumni Research Foundation, Madison, WI (US)

(72) Inventors: Guang-Hong Chen, Madison, WI (US); Jiang Hsieh, Brookfield, WI (US)

(73) Assignees: GE PRECISION HEALTHCARE LLC, Milwaukee, WI (US); WISCONSIN ALUMNI RESEARCH FOUNDATION, Madison, WI (US)

( * ) Notice: Subject to any disclaimer, the term of this patent is extended or adjusted under 35 U.S.C. 154(b) by 412 days.

(21) Appl. No.: 17/350,906

(22) Filed: Jun. 17, 2021

(65) Prior Publication Data
US 2022/0405990 A1   Dec. 22, 2022

(51) Int. Cl.
*G06T 11/00* (2006.01)
(52) U.S. Cl.
CPC .......... *G06T 11/005* (2013.01); *G06T 11/006* (2013.01); *G06T 2211/412* (2013.01); *G06T 2211/424* (2013.01)

(58) Field of Classification Search
CPC .............. G06T 11/005; G06T 11/006; G06T 2211/412; G06T 2211/424; G06T 2211/441; G06T 11/008; G06T 5/001; G06T 5/002; G06T 7/0012; G06T 2207/10081; G06T 2207/20081; G06T 2207/20104; G06N 3/04; G06N 3/08; G06V 10/25; G06V 10/82
See application file for complete search history.

(56) References Cited

U.S. PATENT DOCUMENTS

| | | | |
|---|---|---|---|
| 8,111,893 | B2 | 2/2012 | Chen et al. |
| 8,194,937 | B2 | 6/2012 | Chen |
| 8,204,172 | B1 | 6/2012 | Hsieh et al. |
| 8,218,907 | B2 | 7/2012 | Chen et al. |
| 8,229,199 | B2 | 7/2012 | Chen et al. |

(Continued)

FOREIGN PATENT DOCUMENTS

| | | |
|---|---|---|
| JP | 2015009152 A | 1/2015 |
| JP | 2020068881 A | 5/2020 |

OTHER PUBLICATIONS

Hayes, J. et al., "High Pitch Helical CT Reconstruction," IEEE Transactions on Medical Imaging, May 25, 2021, 11 pages.

(Continued)

*Primary Examiner* — Ping Y Hsieh
(74) *Attorney, Agent, or Firm* — McCoy Russell LLP

(57) ABSTRACT

Methods and systems are provided for increasing a quality of computed tomography (CT) images reconstructed from high helical pitch scans. In one embodiment, the current disclosure provides for a method comprising generating a first computed tomography (CT) image from projection data acquired at a high helical pitch; using a trained multidimensional statistical regression model to generate a second CT image from the first CT image, the multidimensional statistical regression model trained with a plurality of target CT images reconstructed from projection data acquired at a lower helical pitch; and performing an iterative correction of the second CT image to generate a final CT image.

20 Claims, 7 Drawing Sheets

(56) References Cited

U.S. PATENT DOCUMENTS

| | | | |
|---|---|---|---|
| 8,315,353 B1 | 11/2012 | Hsieh et al. | |
| 8,326,054 B2 | 12/2012 | Chen et al. | |
| 8,374,413 B2 | 2/2013 | Chen | |
| 8,483,463 B2 | 7/2013 | Chen et al. | |
| 8,509,514 B2 | 8/2013 | Chen | |
| 8,781,243 B2* | 7/2014 | Chen | G06T 11/005 |
| | | | 382/131 |
| 9,076,237 B2* | 7/2015 | Chen | A61B 6/5205 |
| 9,208,588 B2* | 12/2015 | Chen | G06T 11/008 |
| 9,305,358 B2 | 4/2016 | Matthews | |
| 9,384,566 B2* | 7/2016 | Chen | G06T 11/003 |
| 11,334,990 B2 | 5/2022 | Yamada | |
| 2007/0121780 A1* | 5/2007 | Watanabe | A61B 6/032 |
| | | | 378/8 |
| 2010/0183214 A1* | 7/2010 | McCollough | A61B 6/027 |
| | | | 378/4 |
| 2014/0270439 A1* | 9/2014 | Chen | G06T 11/003 |
| | | | 382/131 |
| 2015/0086097 A1* | 3/2015 | Chen | G06T 5/002 |
| | | | 382/131 |
| 2016/0134852 A1* | 5/2016 | Gao | G06T 5/001 |
| | | | 348/745 |
| 2019/0328341 A1* | 10/2019 | Katsevich | G06N 3/048 |
| 2020/0170601 A1* | 6/2020 | Gagnon | A61B 6/4085 |

OTHER PUBLICATIONS

Hayes, John W. et al., High Pitch Helical CT Reconstruction, IEEE Transactions on Medical Imaging, vol. 40, No. 11, p. 3077-3088, 2021.

JP application 2022-090558 filed Jun. 3, 2022—Office Action dated Aug. 2, 2023; Machine Translation; 9 pages.

* cited by examiner

SYSTEMS AND METHODS FOR COMPUTED TOMOGRAPHY IMAGE RECONSTRUCTION

TECHNICAL FIELD

Embodiments of the subject matter disclosed herein relate to medical imaging, and more particularly, to systems and methods for image reconstruction from computerized tomography data.

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of x-rays through the target volume, to acquire image data and to construct tomographic images (e.g., three-dimensional (3D) representations of the interior of the human body or of other imaged structures).

In computed tomography (CT), an x-ray source and an x-ray detector are arranged on opposite sides of a gantry encircling a body of the patient lying on a table, and a cross-sectional image (e.g., slice) of a region of interest (ROI) is reconstructed from x-ray data (e.g., projections) acquired from the body as the x-ray source and the x-ray detector rotate around the body. A position of the table of the gantry may be adjusted in a superior/inferior (SI) direction (e.g. a z-direction) along a central axis of the gantry over time to generate a plurality of slices from which one or more images may be generated. The table may be continuously adjusted in real time, where projections are acquired as the x-ray source follows a trajectory of a spiral or a helix around the patient. The images reconstructed from the slices may be combined to create a 3D volumetric image of the ROI.

A quality of the reconstructed images may depend on a pitch of a CT scan, where pitch reflects a relationship between a velocity of table movement in the z-direction, an x-ray collimation in the z-direction, and a rotational speed of the gantry (e.g., a distance between spirals of the helix). When the pitch is 1, the distance between the spirals of the helix (e.g. in millimeters) is equal to an irradiated dimension of the x-ray in the z-direction on the x-ray detector (e.g., in millimeters). As the pitch increases, an amount of projection data used to perform reconstruction decreases. Therefore, as the pitch increases, the quality of the reconstructed images may decrease due to interpolating data points over a greater distance, while the duration of the scan and the exposure of the patient to radiation may decrease. Thus, there is a tradeoff between time and radiation exposure on one hand, and quality on the other hand, where an increase in quality entails a longer procedure and greater radiation exposure for the patient, and a shorter procedure with less radiation exposure entails a decrease in quality. Alternatively, a detector coverage in the z-direction can be increased to allow for faster scan time. However, increasing the detector coverage entails using a CT system with a higher cost, whereby a second tradeoff exists between a cost of a CT system and a scan time.

SUMMARY

The current disclosure at least partially addresses one or more of the above identified issues by a method comprising generating a first computed tomography (CT) image from projection data acquired at a first helical pitch; using a trained multidimensional statistical regression model to generate a second CT image from the first CT image, the multidimensional statistical regression model trained with a plurality of target CT images reconstructed from projection data acquired at a second helical pitch, the second helical pitch less than the first helical pitch; and performing an iterative correction of the second CT image to generate a final CT image.

In other words, a prior training procedure and a 3-step image improvement procedure are presented to improve a quality of a CT image generated from high helical pitch data. In the prior training procedure, the multidimensional statistical regression model is trained using pairs of images, including a first artifact-free image reconstructed at a low helical pitch and a second image reconstructed at a high helical pitch, where the model learns to transform the high-pitch image (lower quality) into the low helical pitch image (higher quality). Once the model is trained, the multidimensional statistical regression model may be deployed in the 3-step procedure to generate higher-quality images from lower quality, high-pitch helical images.

In a first step of the 3-step procedure, an initial CT image is reconstructed from projection data acquired at a high helical pitch, where interpolation is used to fill in missing data. In a second step of the 3-step procedure, the CT image is corrected by the trained multidimensional statistical regression model to generate a higher-quality (e.g., low helical pitch) image from the initial CT image reconstructed in the first step. In a third step, the corrected CT image is further corrected via a second, iterative correction procedure to ensure that subject-specific information in the initial CT image is preserved in the corrected CT image.

For example, the first CT image may be reconstructed from projection data acquired from a 32 slice CT scanner (e.g., high helical pitch data relative to a 64 slice CT scanner) using standard reconstruction techniques such as filtered backprojection, iterative reconstruction, etc., or using deep learning image reconstruction with missing data estimations. The multidimensional statistical regression model may be a neural network trained using training data comprising image pairs, each image pair including a target image of the plurality of target CT images, and an input image. The plurality of target CT images may be reconstructed from projection data acquired from a 64 slice CT scanner (e.g., low helical pitch data relative to the 32 slice CT scanner) using the standard reconstruction techniques), and the input image may be reconstructed from pseudo high helical pitch data generated from the low helical pitch data of the 64 slice CT scanner. In one example, the pseudo high helical pitch data is generated by discarding half the projection data of the low helical pitch data. For example, the 64 slice CT scanner may be a multi-row detector CT scanner including 64 x-ray detector rows, where 32 of the 64 x-ray detector rows may be discarded.

Once trained, the trained multidimensional statistical regression model may be used to generate a higher-quality CT image from the lower-quality first CT image (e.g., a high helical pitch image). For example, the higher-quality image may have a lesser number of artifacts (e.g., streaking), a higher resolution than the first image, and/or less noise than the first image. An iterative correction procedure may then subsequently be carried out on the higher-quality image to generate a final CT image, where the iterative correction procedure ensures that the final CT image is consistent with the subject-specific sinogram data of the first image and that no undesired additional information is added to corrupt the final CT image. The final CT image may be displayed on a display device, or stored (e.g., in a database), or inputted into a different image processing system. In this way, a degree of quality of a set of images generated at a high-pitch that may not be sufficient for clinical diagnoses may be increased to a degree of quality associated with a set of images generated at a low helical pitch, which may be sufficient for clinical diagnoses, without subjecting a patient to a longer scan and a greater amount of radiation exposure of a low helical pitch scans. An additional advantage is that a lower cost CT scanner may be used to generate images typical of a higher cost CT scanner, thereby reducing manufacturing costs.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
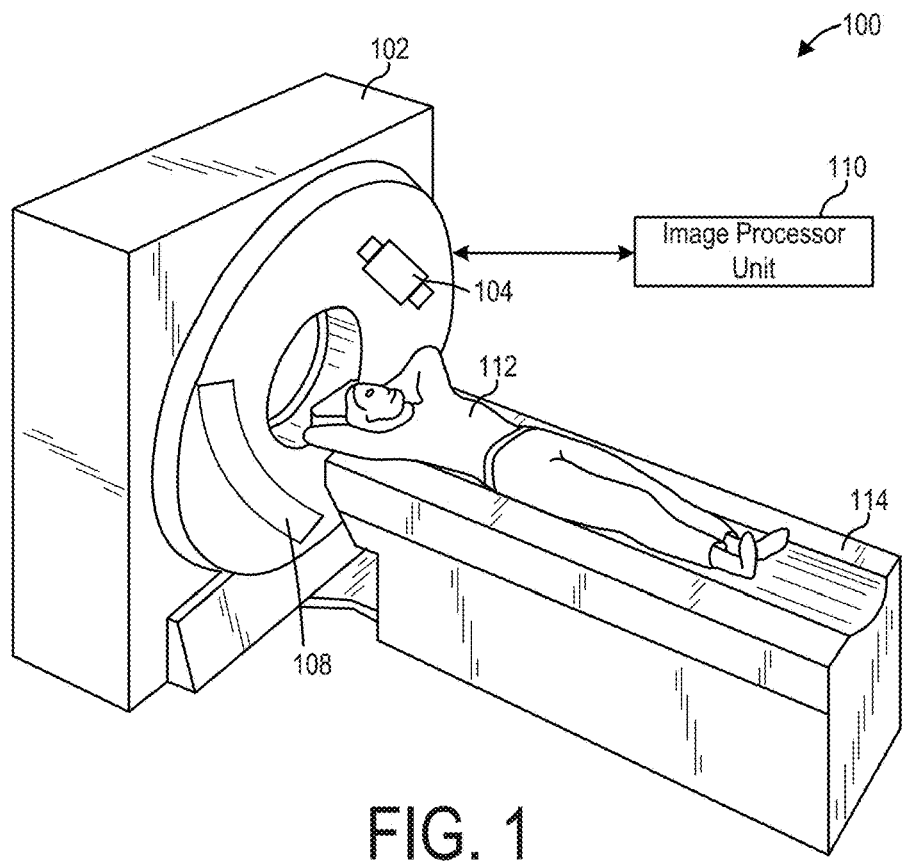
FIG. 1 shows a pictorial view of an imaging system, according to an embodiment.

The drawings illustrate specific aspects of the described systems and methods for mapping one or more ultrasound images in a first resolution to one or more corresponding ultrasound images in a target resolution using generative neural networks. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to methods and systems for increasing a quality of computed tomography (CT) images reconstructed from high helical pitch data. For the purposes of this disclosure, high helical pitch data is projection data acquired from a CT scanner during a helical scan with a pitch higher than 1.5, while low helical pitch data is projection data acquired from a CT scanner during a helical scan with a pitch equal to 1.5, as described in greater detail below.

Images may be reconstructed from the projection data, where an image may be generated for each reconstruction plane of the projection data. Each reconstruction plane may comprise a plurality of image voxels that are illuminated by an x-ray source of the CT scanner as the x-ray source rotates within a gantry of the CT scanner around the subject on the table. At each rotational position around the subject, the x-ray source may illuminate a portion of image voxels of the reconstruction plane, where the portion corresponds to a view angle of the x-ray source. As the x-ray source rotates through each rotational position, the view angle changes, resulting in a different portion of image voxels being illuminated. Thus, complete projection data is acquired over 180 degrees plus fan angle, also known as short scan angular range. However, as the pitch increases, the angular range of view angles illuminating the image voxels of the reconstruction plane may decrease. For example, at a pitch of 1, the angular range of view angles may be 360°, where all the image voxels of a first reconstruction plane may be illuminated. At a pitch of 2, the angular range of view angles within the first reconstruction plane may be 180°, where image voxels of the first reconstruction plane may be illuminated as the x-ray source sweeps from 0° to 180°, and the image voxels of a second reconstruction plane, adjacent to the first reconstruction plane, may be illuminated as the x-ray source sweeps from 180° to 360°. Therefore, at the pitch of 2, an amount of projection data acquired in the first and second reconstruction planes may be half of the complete projection data. At a pitch of 3, the angular range of view angles within the first reconstruction plane may be 120°, where the image voxels of the first reconstruction plane may be illuminated as the x-ray source sweeps from 0° to 120°, a the image voxels of the second reconstruction plane may be illuminated as the x-ray source sweeps from 120° to 240°, and the image voxels of a third reconstruction plane, the third reconstruction plane adjacent to the second reconstruction plane, may be illuminated as the x-ray source sweeps from 240° to 360°. Therefore, at the pitch of 3, an amount of projection data acquired in the first, second, and third reconstruction planes may be a third of the complete projection data. Thus, as the pitch increases, increasingly limited view angle data may be available in a reconstruction plane for image reconstruction.

A threshold pitch may exist at which the projection data acquired in a reconstruction plane may not meet sufficiency conditions for image reconstruction, whereby it may not be possible to reconstruct an image for the reconstruction plane. In one embodiment, the sufficiency conditions include the Tuy data sufficiency condition, and the threshold pitch is around 1.5. To reconstruct an image from a reconstruction plane with insufficient projection data, data interpolation and/or extrapolation may be used to generate sufficient data to reconstruct the image. Further, the data interpolation and/or extrapolation may be performed both within a reconstruction plane and between reconstruction planes. In other words, image reconstruction at high helical pitch entails resolving two distinct data insufficiency challenges: limited (e.g., truncated) view angle data, as described above, and undersampling in the SI or z-direction, where there are gaps in data in the z-direction between each helical rotation of the x-ray source. Both limited view angle data and undersampling in the z-direction may be causes of artifacts.

For example, a first helical scan of a patient may be performed with a pitch of 1.0, where images are reconstructed from a complete set of projection data (e.g., full view reconstruction). With full view reconstruction, there are no gaps in the projection data, generating a reconstructed image with a quality that is high. A second helical scan may be performed with a pitch of 2.0, where images are reconstructed from incomplete projection data (e.g., partial view reconstruction). With partial view reconstruction, there are gaps in the projection data, and each image is reconstructed from a combination of projection data and interpolated data. One advantage of the second helical scan over the first helical scan is that a duration of the second helical scan is shorter than the first helical scan, and as a consequence, the patient is exposed to less (e.g., half as much) radiation and is subject to shorter breath-hold time. Additionally, images reconstructed from high-pitch helical scans may have higher image quality consistency than images reconstructed from low-pitch helical scans when features of a target ROI change over time. For example, in cardiac CT scans, inconsistencies between heartbeats may be reduced in high-pitch helical scans. However, compared to the first helical scan, a disadvantage of the second helical scan is that a quality of the reconstructed images may be lower than a quality of the first helical scan, due to the limited view angle data and undersampling in the z-direction, where the interpolation may lead to image blurring or the appearance of artifacts. Thus, typical CT scan protocols may limit pitch to maintain a high quality of reconstructed images, which may increase scan time and the radiation dose.

The current disclosure provides a procedure for increasing the quality of images acquired from a subject that are obtained from incomplete projection data acquired from a subject at a relatively high helical pitch, comprising three steps. In a first, partial view reconstruction step, data interpolation and/or extrapolation are used to generate a complete data set for the conventional filtered backprojection reconstruction algorithms used in current CT scanners to reconstruct a set of first prior images from the incomplete projection data. In a second, image improvement step, a trained multidimensional statistical regression model is used to generate improved second prior images from the reconstructed first prior images. Finally, in a third image correction step, a procedure is carried out to iteratively correct the improved second prior images using authentic sinogram data collected from the subject prior to the data interpolation and/or extrapolation of the first, partial view reconstruction step. The current disclosure further provides for training systems and methods enabling the multidimensional statistical regression model to be trained to learn a mapping from a high helical pitch image to a target helical pitch image.

Figure 2:
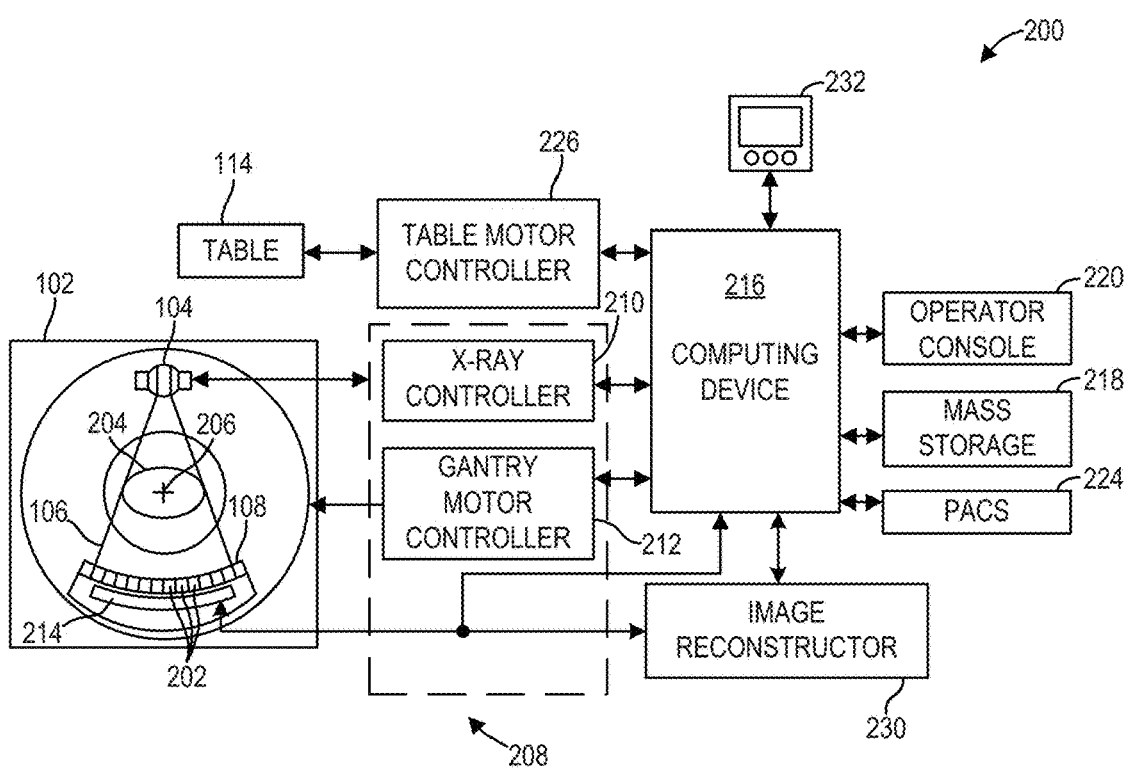
FIG. 2 shows a block schematic diagram of an exemplary imaging system, according to an embodiment.

An example of a computed tomography (CT) imaging system that may be used to perform contrast scans in accordance with the present techniques is provided in FIGS. 1 and 2. The imaging system 200 may be communicatively coupled to a helical pitch mapping system, such as the helical pitch mapping system 302 of FIG. 3. The helical pitch mapping system may include a multidimensional statistical regression model, such as a deep learning neural network model, stored in non-transitory memory.

Figure 4:
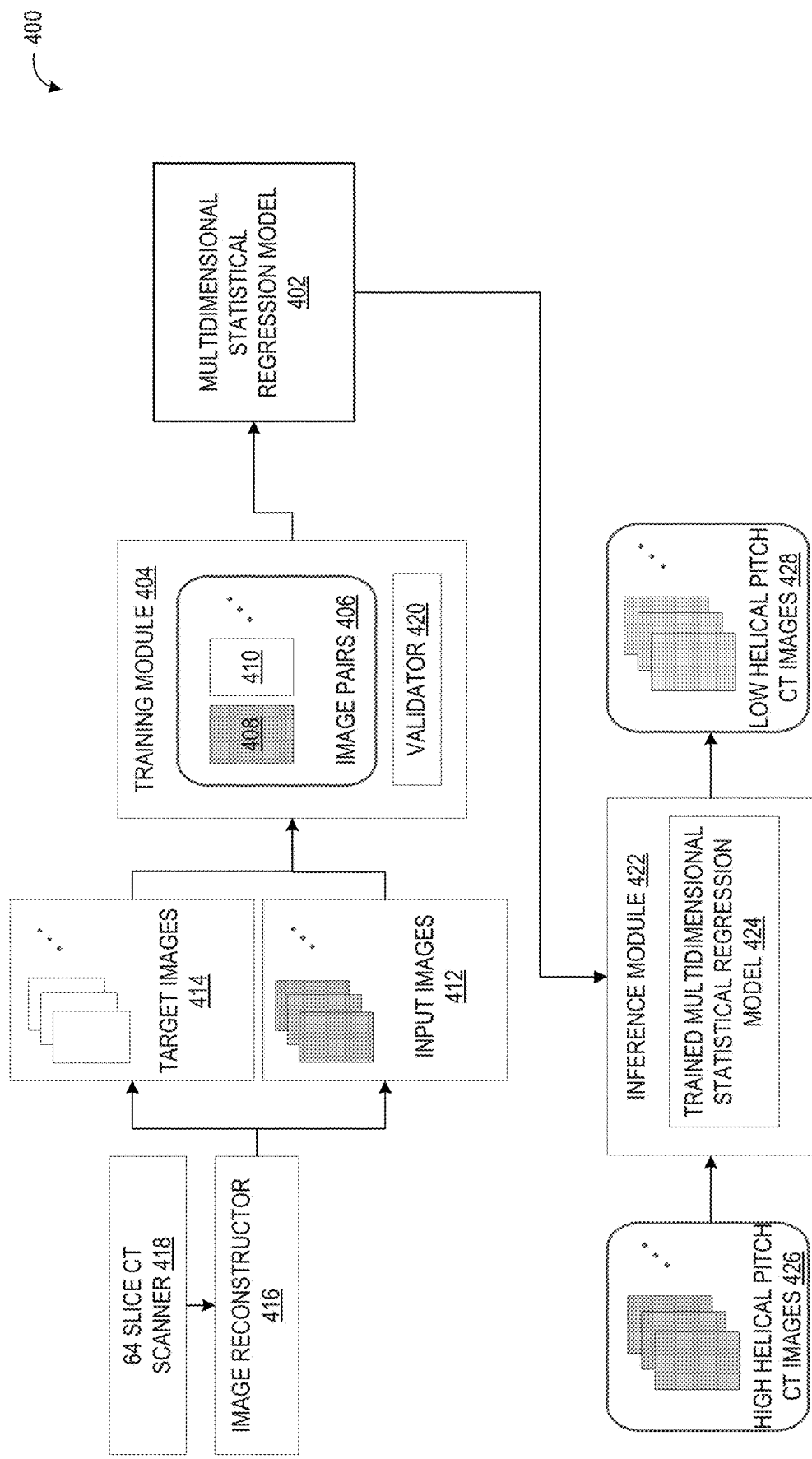
FIG. 4 shows a block diagram of an exemplary embodiment of a helical pitch mapping training system.

The multidimensional statistical regression model may be trained using a multidimensional statistical regression model training system 400, shown in FIG. 4. In one embodiment where the multidimensional statistical regression model is a deep learning neural network, a high-level method such as method 500 of FIG. 5 may be used to train the deep learning neural network to learn a mapping from an image reconstructed with high helical pitch data to a target image reconstructed with low helical pitch data. A training dataset for training the deep learning neural network may be generated by a procedure such as method 600 of FIG. 6, and training of the deep learning neural network may be carried out in accordance with a method 700 of FIG. 7. A trained multidimensional statistical regression model may be deployed by the helical pitch mapping system to generate CT images having a quality associated with low helical pitch data from one or more new CT images reconstructed from high helical pitch data to, by executing one or more operations of method 800 of FIG. 8.

Though a CT system is described by way of example, it should be understood that the present techniques may also be useful when applied to images acquired using other imaging modalities, such as tomosynthesis, PET imaging, C-arm angiography, and so forth. The present discussion of a CT imaging modality is provided merely as an example of one suitable imaging modality.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts a single x-ray source 104, in certain embodiments, multiple x-ray sources and detectors may be employed to project a plurality of x-ray radiation beams for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of an x-ray radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the x-ray beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional image of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments in which data representing an image is generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration (e.g., multi-row detector CT or MDCT), one or more additional rows of the detector elements 202 are arranged in a parallel configuration for acquiring the projection data. The configuration may include 4, 8, 16, 32, 64, 128, or 256 detector rows. For example, a 64-slice MDCT scanner may have 64 detector rows with a collimator width of 4 cm, while a 256-slice MDCT scanner may have 256 detector rows with a collimator width of 16 cm. Thus, four rotations of a helical scan performed with the 64-slice MDCT scanner may achieve a detector coverage equivalent to a single rotation of scan performed with the 256-slice MDCT scanner.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The image reconstructor 230 may also include one or more image processing subsystems that may be used to aid in image reconstruction. For example, for helical scans with a pitch higher than 1, the one or more image processing subsystems may extrapolate and/or interpolate image data between the density images corresponding to individual cross sections of the subject 204. The one or more image processing subsystems may include deep learning or other high-dimensional statistical models to aid in extrapolating and/or interpolating the image data. In one embodiment, the one or more image processing subsystems may include a helical pitch mapping system that maps reconstructed images based on high helical pitch data to reconstructed images based on low helical pitch data to improve a quality of the reconstructed images, as described below in reference to FIG. 3.

Figure 3:
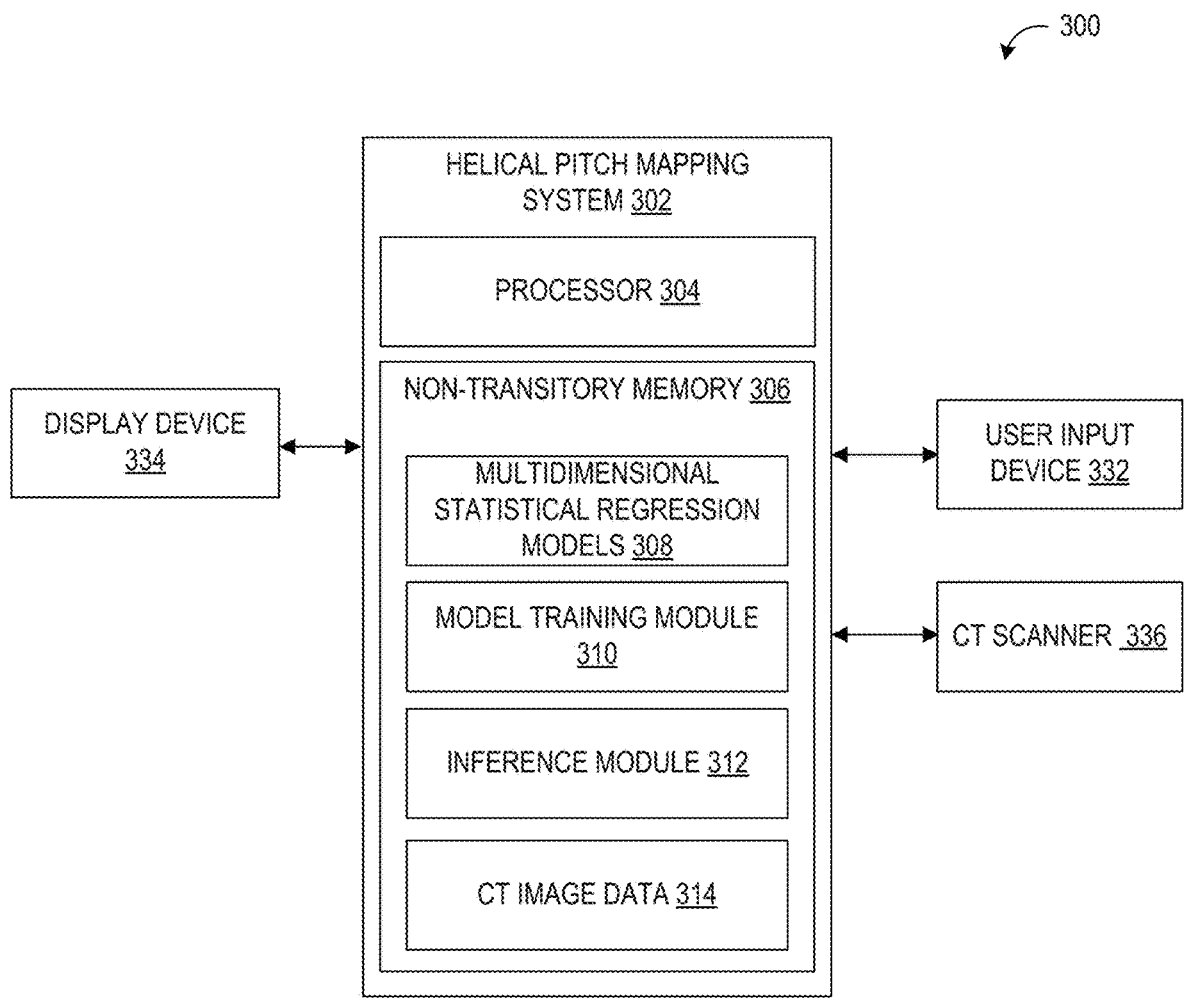
FIG. 3 shows a block diagram of an exemplary embodiment of a helical pitch mapping system configured to map high helical pitch images to low helical pitch images, using a multidimensional statistical regression model.

Referring to FIG. 3, a helical pitch mapping system 302 is shown, in accordance with an embodiment. In an embodiment, the helical pitch mapping system 302 is incorporated into the imaging system 200. For example, the helical pitch mapping system 302 may be provided in the imaging system 200 within the image reconstructor 230, or within the computing device 216. In some embodiments, at least a portion of helical pitch mapping system 302 is disposed at a device (e.g., edge device, server, etc.) communicably coupled to the imaging system 200 via wired and/or wireless connections. In some embodiments, at least a portion of helical pitch mapping system 302 is disposed at a separate device (e.g., a workstation) which can receive images from the imaging system 200 or from a storage device which stores the images/data generated by the imaging system 200. Helical pitch mapping system 302 may be operably/communicatively coupled to a user input device 332 and a display device 334. The user input device 332 may comprise the operator console 220 of the imaging system 200, while the display device 334 may comprise the display device 232 of the imaging system 200, at least in some examples.

Helical pitch mapping system 302 includes a processor 304 configured to execute machine readable instructions stored in a non-transitory memory 306. Processor 304 may be single core or multi-core, and the programs executed thereon may be configured for parallel or distributed processing. In some embodiments, the processor 304 may optionally include individual components that are distributed throughout two or more devices, which may be remotely located and/or configured for coordinated processing. In some embodiments, one or more aspects of the processor 304 may be virtualized and executed by remotely-accessible networked computing devices configured in a cloud computing configuration.

Non-transitory memory 306 may store one or more multidimensional statistical regression models 308, a model training module 310, an inference module 312, and MDCT image data 314. The one or more multidimensional statistical regression models 308 may be high dimensional statistical regression models. One multidimensional statistical regression model 308 may be a neural network-based deep learning model, which may include trained and/or untrained neural networks, and may further include various data or metadata pertaining to the one or more neural networks stored therein. In other examples, a multidimensional statistical regression model 308 may not be a neural network-based model, and may be another type of computer model configured to perform high dimensional statistical regressions. For example, the multidimensional statistical regression model 308 may be an algorithm that performs a "best fit" to identify images that best match a first reconstructed image, or an algorithm that performs an additional non-rigid registration that further refines an image correction. While a single multidimensional statistical regression model 308 is described below, it should be appreciated that one or more different multidimensional statistical regression models 308 may be included without departing from the scope of this disclosure.

Non-transitory memory 306 may further store a training module 310, which comprises instructions for training the multidimensional statistical regression model 308. Training module 310 may include instructions that, when executed by the processor 304, cause helical pitch mapping system 302 to conduct one or more of the steps of method 600 for a generation of a training dataset, to be used in accordance with method 500 for mapping reconstructed images with high-pitch helical data to images reconstructed with low helical pitch data, discussed in more detail below in reference to FIGS. 6 and 5, respectively. In some embodiments, training module 310 includes instructions for implementing one or more gradient descent algorithms, applying one or more loss functions, and/or training routines, for use in adjusting parameters of one or more neural networks of multidimensional statistical regression model 308.

Non-transitory memory 306 also stores an inference module 312 that comprises instructions for processing new projection data with the trained multidimensional statistical regression model 308. The reconstruction and enhancement of images with the trained multidimensional statistical regression model 308 may be performed within the inference module 312 as described in FIG. 8. In particular, inference module 312 may include instructions that, when executed by processor 304, cause the helical pitch mapping system 302 to conduct one or more of the steps of method 800, as described in further detail below.

Non-transitory memory 306 further stores CT image data 314. CT image data 314 may include, for example, CT images acquired via a CT scanner. In one embodiment, the CT scanner is a multi-row detector CT (MDCT) scanner. In one embodiment, the CT scanner is a 64 slice CT scanner, where the CT scanner includes 64 detector rows. In other embodiments, the CT scanner may be an MDCT scanner that includes a different number of detector rows (e.g., 128, 256, etc.). In another embodiment, the CT scanner may be a dual-source or multi-source scanner. As described in greater detail below, the CT image data 314 may include training and/or test sets of image pairs used to train and/or test the multidimensional statistical regression model 308. For example, each image pair of the image pairs may comprise one image of a region of interest (ROI) of a subject reconstructed from high helical pitch data acquired via a 32 slice CT scanner, and one image of the ROI reconstructed from low helical pitch data acquired via a 64 slice CT scanner, where the multidimensional statistical regression model 308 may be trained to receive the image reconstructed with high helical pitch data as input and output an improved version of the image with a quality of an image reconstructed with low helical pitch data. In some embodiments, the CT image data 314 may include a plurality of training sets.

In some embodiments, the non-transitory memory 306 may include components disposed at two or more devices, which may be remotely located and/or configured for coordinated processing. In some embodiments, one or more aspects of the non-transitory memory 306 may include remotely-accessible networked storage devices configured in a cloud computing configuration.

User input device 332 may comprise one or more of a touchscreen, a keyboard, a mouse, a trackpad, a motion sensing camera, or other device configured to enable a user to interact with and manipulate data within helical pitch mapping system 302. For example, user input device 332 may enable a user to enter in patient information, categorize a patient into one or more different categories, select a reconstruction plane of one or more 3D volumetric images in one or more orientations, select a trained multidimensional statistical regression model from a collection of trained multidimensional statistical regression models, and/or initiate a procedure to adjust a quality of images reconstructed from high helical pitch data.

Display device 334 may include one or more display devices utilizing virtually any type of technology. In some embodiments, display device 334 may comprise a computer monitor. Display device 334 may be combined with processor 304, non-transitory memory 306, and/or user input device 332 in a shared enclosure, or may be peripheral display devices and may comprise a monitor, touchscreen, projector, or other display device known in the art, which may enable a user to view reconstructed images produced by the imaging system 200, and/or interact with various data stored in non-transitory memory 306.

It should be understood that helical pitch mapping system 302 shown in FIG. 2 is for illustration, not for limitation. Another appropriate image processing system may include more, fewer, or different components.

Referring to FIG. 4, an example of a helical pitch mapping training system 400 is shown. Helical pitch mapping training system 400 may be implemented by one or more computing systems, such as helical pitch mapping system 302 of FIG. 3, to train a multidimensional statistical regression model (e.g., the multidimensional statistical regression model 308 of FIG. 3) to learn a mapping from an image reconstructed from high helical pitch data to an image reconstructed from low helical pitch data. In an embodiment, helical pitch mapping training system 400 includes a multidimensional statistical regression model 402, to be trained, and a training module 404 that includes a training dataset comprising a plurality of image pairs 406. The training module 404 may be the same as or similar to the model training module 310 of helical pitch mapping system 300 of FIG. 3. It should be appreciated that while the multidimensional statistical regression model 402 is described herein as a neural network-based deep learning model, in other embodiments the multidimensional statistical regression model 402 may be a different type of statistical regression model that may be trained on CT image data.

Each image pair of the plurality of image pairs 406 comprises one input image 408 of an ROI of one or more subjects and one target image 410 of the same ROI. In one example, the input image 408 is reconstructed from high helical pitch data, where a portion of the data used to reconstruct the input image is interpolated, and the target image 410 is reconstructed with low helical pitch data, where no interpolated data is used to reconstruct the target image. In one embodiment, the input image 408 is drawn from a set of input images 412 (e.g., images that are reconstructed based on projection data and interpolated data) and the target image 410 is drawn from a set of target images 414 (e.g., images that are reconstructed based on projection data).

In one embodiment, the set of input images 412 and the set of target images 414 are both reconstructed by an image reconstructor 416 from projection data acquired during a scan of the ROI via a 64 slice CT scanner 418. For example, a plurality of subjects may be scanned using the 64 slice CT scanner 418, and the image reconstructor 416 may reconstruct projection data acquired during each scan of each subject of the plurality of subjects into an image volume (e.g., a 3D volumetric image) of the subject to generate a set of image volumes. The set of image volumes may be divided into training, test, and validation sets of image volumes. The set of input images 412 and the set of target images 414 may then be drawn and/or generated from a plurality of 2D image slices generated from each image volume of the training, test, and validation sets of image volumes.

Further, the set of input images 412 may be obtained by discarding projection data from 32 of the detector rows of the collimator and generating a set of reconstructed images, as described above, based on the 32 remaining slices. The corresponding set of target images 414 may be reconstructed from the full 64 slices of projection data acquired during the scan of the ROI. Thus, a target image 410 may be reconstructed based on twice as much data as the input image 408, and may therefore have a higher quality. For example, the target image may include less noise, and/or less artifacts than the input image 408, or the target image may be of a higher resolution than the input image 408. In another embodiment, the set of input images 412 may be reconstructed from projection data acquired during a scan of the ROI via a 32 slice CT scanner, and a corresponding set of target images 414 may be reconstructed from projection data acquired during a scan of the ROI via a 64 slice CT scanner. In still other embodiments, a different procedure may be used to generate the image pairs 406. An example method for generating the plurality of image pairs 406 is described in further detail below with respect to FIG. 6.

In one embodiment, the multidimensional statistical regression model 402 is a neural network configured to receive the plurality of image pairs 406 from the training module 404, and to iteratively adjust one or more parameters of the multidimensional statistical regression model 402 during training to minimize an error function based on an assessment of differences between each input image 408 and a corresponding target image 410 of each image pair of the plurality of image pairs 406. Error minimization during training is described in greater detail below in reference to FIG. 7.

In some embodiments, multidimensional statistical regression model 402 may comprise a generative neural network. In some embodiments, multidimensional statistical regression model 402 may comprise a generative adversarial network. In some embodiments, multidimensional statistical regression model 402 may comprise a generative neural network having a U-net architecture. In some embodiments, the generative neural network comprises one or more convolutional layers, which in turn comprise one or more convolutional filters (e.g., a convoluted neural network architecture). The convolutional filters may comprise a plurality of weights, wherein the values of the weights are learned during a training procedure. The convolutional filters may correspond to one or more visual features/patterns, thereby enabling the multidimensional statistical regression model 402 to identify and extract features from the reconstructed images.

The plurality of image pairs 406 may be split into a number of training image pairs and a smaller number of test image pairs and/or validation image pairs (not shown in FIG. 4) to validate the model and to ensure that sufficient training data is available to prevent overfitting (e.g., where the multidimensional statistical regression model 402 learns to map features specific to samples of the training image pairs that are not present in the test image pairs). In one example, the image pair is assigned to either the training image pairs or the test image pairs randomly in a pre-established proportion. For example, each image pair may be assigned to either the training image pairs or the test image pairs randomly such that 75% of the image pairs are assigned to the training image pairs, and 25% of the image pairs generated are assigned to the test image pairs. It should be appreciated that the examples provided herein are for illustrative purposes, and image pairs may be assigned to the training image pairs or the test image pairs via a different procedure and/or in a different proportion without departing from the scope of this disclosure.

Helical pitch mapping training system 400 may include a validator 420 that validates the performance of the multidimensional statistical regression model 402. The validator 420 may take as input a trained or partially trained multidimensional statistical regression model 402 and a dataset of the test image pairs, and may output an assessment of the performance of the trained or partially trained multidimensional statistical regression model 402 on the dataset of test image pairs. In an embodiment, the assessment of the performance of the trained or partially trained multidimensional statistical regression model 402 may be determined based on an average of a minimum error rate achieved on each image pair of test image pairs, where the minimum error rate is a function of one or more differences between an image outputted by the trained or partially trained multidimensional statistical regression model 402 as result of the input image 408 of the image pair, and the target image 410 of the image pair. In another embodiment, the assessment of the performance of the trained or partially trained multidimensional statistical regression model 402 may include a quality assessment of the image outputted by the trained or partially trained multidimensional statistical regression model 402, where the quality assessment is determined by one or more pre-established, objective variables of the outputted image in comparison with the target image 410. In other embodiments, the assessment of the performance of the trained or partially trained multidimensional statistical regression model 402 may include a combination of an average minimum error rate and a quality assessment, or a different function of the minimum error rates achieved on each image pair of the test image pairs and/or one or more quality assessments, or another factor for assessing the performance of the trained or partially trained multidimensional statistical regression model 402. It should be appreciated that the examples provided herein are for illustrative purposes, and other error functions, error rates, quality assessments, or performance assessments may be included without departing from the scope of this disclosure.

For example, the multidimensional statistical regression model 402 may be trained using a training set of 500,000 training pairs, the multidimensional statistical regression model 402 may be tested during training using a test set of 125,000 training pairs, and a trained multidimensional statistical regression model 402 may be validated with a validation dataset of 75,000 image pairs 406, where each of the image pairs 406 comprises an input image 408 of a heart and a target image 410 of the heart. The validator 420 may feed the input image 408 into the partially trained multidimensional statistical regression model 402 and receive an output image of the heart of the subject. The validator 420 may then compare the output image of the heart generated by the partially trained multidimensional statistical regression model 402 with the target image of the heart from the relevant image pair, and output a value indicating a degree of similarity between the output image and the target image 410. The degree of similarity may be determined by a loss function, as described above. In an embodiment, the degree of similarity may be expressed as a percentage (e.g., a 90% similarity rating), and the validator 420 may return a binary result of 1 indicating that the degree of similarity exceeds a threshold similarity percentage (e.g., 85%), and that the partially trained multidimensional statistical regression model 402 has successfully mapped the input image 408 to the target image 410. Alternatively, the validator 420 may return a binary result of 0 indicating that the degree of similarity does not exceed a threshold similarity percentage (e.g., 95%), and that the partially trained multidimensional statistical regression model 402 has failed to successfully map the input image 408 to the target image 410. The validator 420 may validate the partially trained multidimensional statistical regression model 402 on each image pair of the test image pairs, and average the results of the similarity assessments performed for each image pair of the test image pairs to determine an overall validation score. If the overall validation score exceeds a threshold (e.g. 0.8), the multidimensional statistical regression model 402 is thereby validated, whereby the multidimensional statistical regression model 402 has been fully trained and may be used to map new input images generated from a CT scanner (e.g., from limited view data) to new output images of higher quality (e.g., that appear to be reconstructed from low helical pitch data). Alternatively, if the overall validation score does not exceed a threshold (e.g. 0.8), the multidimensional statistical regression model 402 is not validated, indicating that the multidimensional statistical regression model 402 is not fully trained. In other embodiments, the validator 420 may output a similarity rating or percentage instead of a binary value, and the similarity ratings or percentages for each image pair may be averaged to determine an overall validation score. It should be appreciated that the examples provided herein are for illustrative purposes, and other procedures and/or functions may be used to validate a performance of a partially trained multidimensional statistical regression model 402 without departing from the scope of this disclosure.

Helical pitch mapping training system 400 may include an inference module 422, which may be a non-limiting example of the inference module 312 of the helical pitch mapping system 302 of FIG. 3. The inference module 422 comprises a trained multidimensional statistical regression model 424 that has been validated by the validator 420 as described above. The inference module 422 may include instructions for deploying the trained multidimensional statistical regression model 402 to generate a set of low helical pitch CT images 428 from a set of new high helical pitch CT images 426, where the set of low helical pitch images 428 are images that appear to be reconstructed from low helical pitch data. For example, the set of low helical pitch images 428 may have a resolution similar to images acquired with low helical pitch, and/or a noise profile of images acquired with low helical pitch, and/or a reduced number of artifacts typically associated with low helical pitch. The low helical pitch CT images 428 may comprise a same number of images as the new high helical pitch CT images 426, wherein for each image of the new high helical pitch CT images 426, a corresponding low helical pitch CT image 428 is produced, such that there is a 1-to-1 correspondence between the new high helical pitch CT images 426 and the low helical pitch CT images 428.

Figure 5:
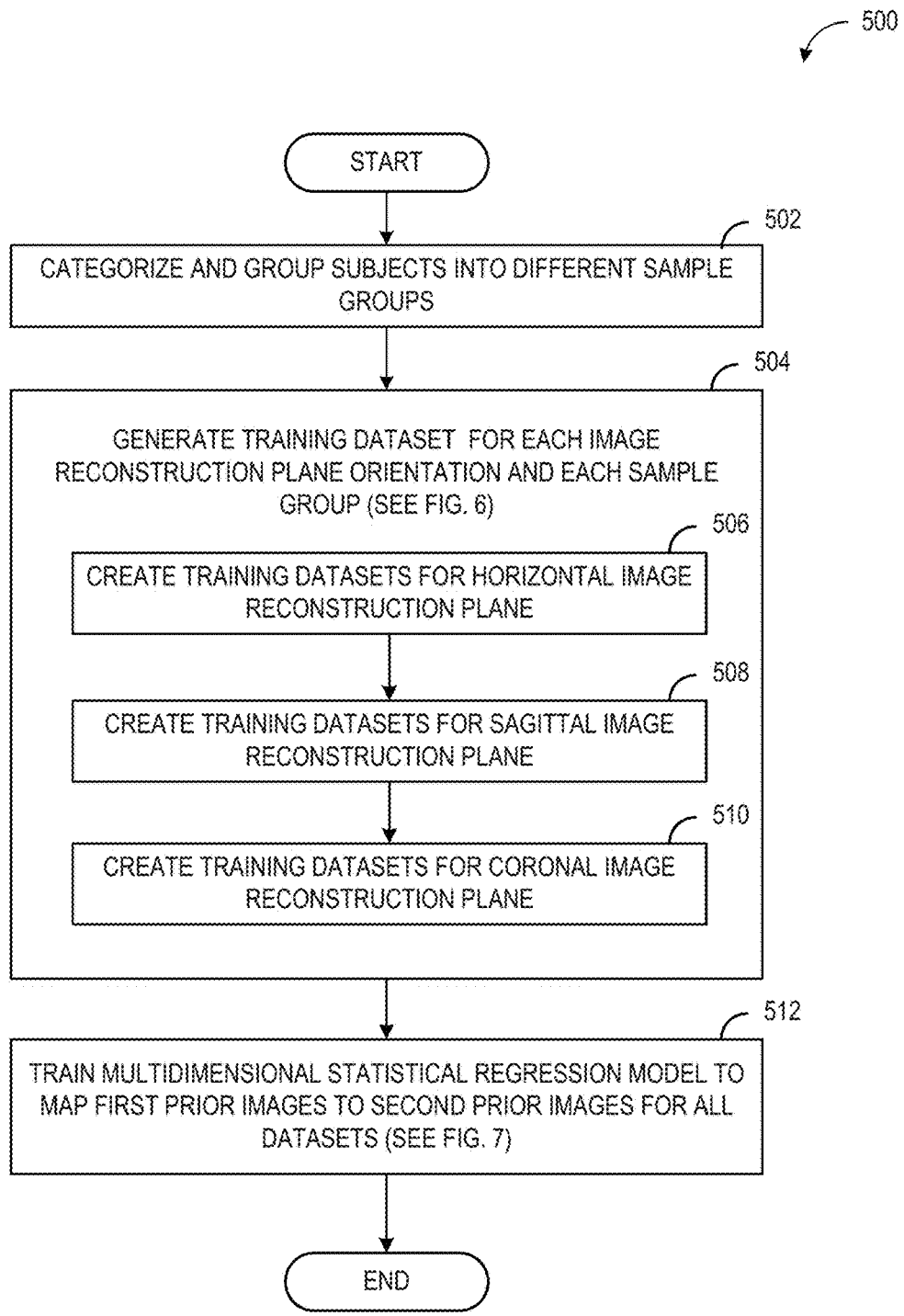
FIG. 5 shows a flowchart of an exemplary high level method for mapping high helical pitch images to low helical pitch images.

Referring to FIG. 5, a flowchart of a method 500 is shown for training a multidimensional statistical regression model (such as one of the multidimensional statistical regression models 308 of the helical pitch mapping system 302 of FIG. 3) according to an exemplary embodiment. Method 500 may be implemented within the model training module of a helical pitch mapping system, such as the model training module 310 of the helical pitch mapping system 302 of FIG. 3, in accordance with a training system such as the multidimensional statistical regression model training system 400 of FIG. 4. In an embodiment, some operations of method 500 may be stored in non-transitory memory and executed by a processor, such as non-transitory memory 306 and processor 304 of helical pitch mapping system 302 of FIG. 3.

At 502, method 500 includes categorizing and grouping subjects into different sample groups, with a goal of generating training datasets within which there is a high degree of anatomical similarity (e.g., where the different sample groups share one or more characteristics such as size, gender, etc.). The training data may include sample data acquired from subjects who may suffer from one or more conditions, as well as sample ultrasound images of healthy tissues and/or acquired from healthy subjects. For example, images acquired for training may include images of organs that are enlarged, swollen, and/or otherwise malformed, or images of anatomical features not present in healthy subjects such as tumors, growths, scar tissue, etc. In some embodiments, a plurality of multidimensional statistical regression models may be trained on a corresponding plurality of ROIs. For example, a first multidimensional statistical regression model may be trained on images of a head of one or more subjects, a second multidimensional statistical regression model may be trained on images of a chest of the one or more subjects, a third multidimensional statistical regression model may be trained on images of an abdomen of the one or more subjects, and so on. Each training dataset used to train the plurality of multidimensional statistical regression models may include image data from a diverse set of subjects (e.g., with different pathologies, different abnormalities, etc., as described above.

In an embodiment, a procedure may be followed during the preparation of the training data to acquire images from a broad range of subjects with different characteristics (e.g., age, sex, etc.) and/or of varying degrees of health and/or of anatomical structures of varying degrees of normality/abnormality. In other embodiments, a different procedure may be followed during the preparation of the training data to acquire images from a select group of subjects, where the select group of subjects shares one or more characteristics.

For example, one sample group may include subjects who are adults and a different sample group may include subjects who are children, or additional sample groups may be created based on a size of the subject (e.g., infants, small children, teens, adults, large or obese adults, etc.). In another example, different sample groups may be created for male and female subjects, for example, if properties of a ROI being scanned differ between men and women. In yet another example, sample groups may be created based on one or more characteristics or properties of the ROI being scanned rather than the subject. For example, one sample group may include subjects with an ROI of a certain size, while another sample group may include subjects with an ROI of a different size. The procedure may be carried out in accordance with a set of inclusion and/or exclusion criteria. For example, the inclusion criteria may include a use of contrast media, where subjects scanned without using contrast media are included and subjects scanned using contrast media are not included. The inclusion criteria may include a range of anatomical coverage (e.g., based on a common ROI, such as a heart), or a position of the subjects (e.g., a supine position), or other criteria. The exclusion criteria may include a body of a subject having a metallic object (e.g., hip implants, pacemakers, implantable cardioverter defibrillators, left ventricular assist devices, spinal hardware, etc.), where subjects with metallic objects may be eliminated from training/test datasets. It should be appreciated that the examples provided herein are for illustrative purposes, and different inclusion and/or exclusion criteria may be used to group subjects into sample groups without departing from the scope of this disclosure.

At 504, method 500 includes generating training datasets for each sample group and each image reconstruction plane orientation, as described in greater detail below in reference to FIG. 6. As each CT scan generates a 3D volumetric image of the ROI from projection data, 2D images may be reconstructed from the 3D volumetric image in one of three orientations: a horizontal orientation (e.g., parallel to a table of a CT scanner), a sagittal orientation (e.g., perpendicular to the table along a Z-axis or length of the table), or a coronal orientation (e.g., perpendicular to the table across the Z-axis). Anatomical features of the ROI may be more visible in one orientation than in a different orientation. For example, an artery may appear as two parallel lines in a first image reconstruction plane, and the artery may appear as a circle in a second, different image reconstruction plane. In some examples, because the helical pitch mapping system involves interpolation of data points between two reconstructed images of parallel reconstruction planes, the multidimensional statistical regression model may be most efficiently trained using a training dataset generated from a single image reconstruction plane orientation. In other examples, to increase consistency of image quality over a targeted image volume, the training may be performed in multiple image reconstruction plane orientations, sequentially or concurrently. Training with data from multiple image reconstruction planes may also improve a performance of the multidimensional statistical regression model.

Thus, at 506, method 500 includes creating training datasets for the horizontal image reconstruction plane for each sample group; at 508, method 500 includes creating a training dataset for the sagittal image reconstruction plane for each sample group; and at 510, method 500 includes creating a training dataset for the coronal image reconstruction plane for each sample group. For example, in an embodiment including a first sample group of healthy child subjects, a second sample group of healthy adults, and a third sample group of obese adults, nine datasets may be generated: horizontal image reconstruction plane datasets created from the first sample group, the second sample group, and the third sample group; sagittal image reconstruction plane datasets created from the first sample group, the second sample group, and the third sample group; and coronal image reconstruction plane datasets created from the first sample group, the second sample group, and the third sample group.

Further, each dataset may include aggregate training data from each subject of a relevant sample group. For example, a first horizontal image reconstruction plane dataset created from the first sample group may include training data generated from a first scan of a first subject of the first sample group, training data generated from a second scan of a second subject of the first sample group, training data generated from a third scan of a third subject of the first sample group, and so on. In one example, the training data of a dataset may be randomized across subjects of the first dataset, whereby training data of an individual subject may be interspersed with training data of other subjects. In other examples, image volumes reconstructed from the sample groups may be divided into training, test, and validation sets prior to extracting 2D training, test, and validation images, whereby a first portion of each sample group is used for training data, a second portion of each sample group is used for test data, and a third portion of each sample group is used for validation data.

The training data used to generate the training datasets may be image pairs including a first prior image (input image) of the ROI and a second prior image (ground truth/target image) of the ROI, based on projection data acquired from the CT scanner in accordance with method 600 of FIG. 6 below.

At 512, method 500 includes training the multidimensional statistical regression model to map the first prior images of the image pairs to the second prior images of the image pair, as described below in reference to method 700 of FIG. 7.

Figure 6:
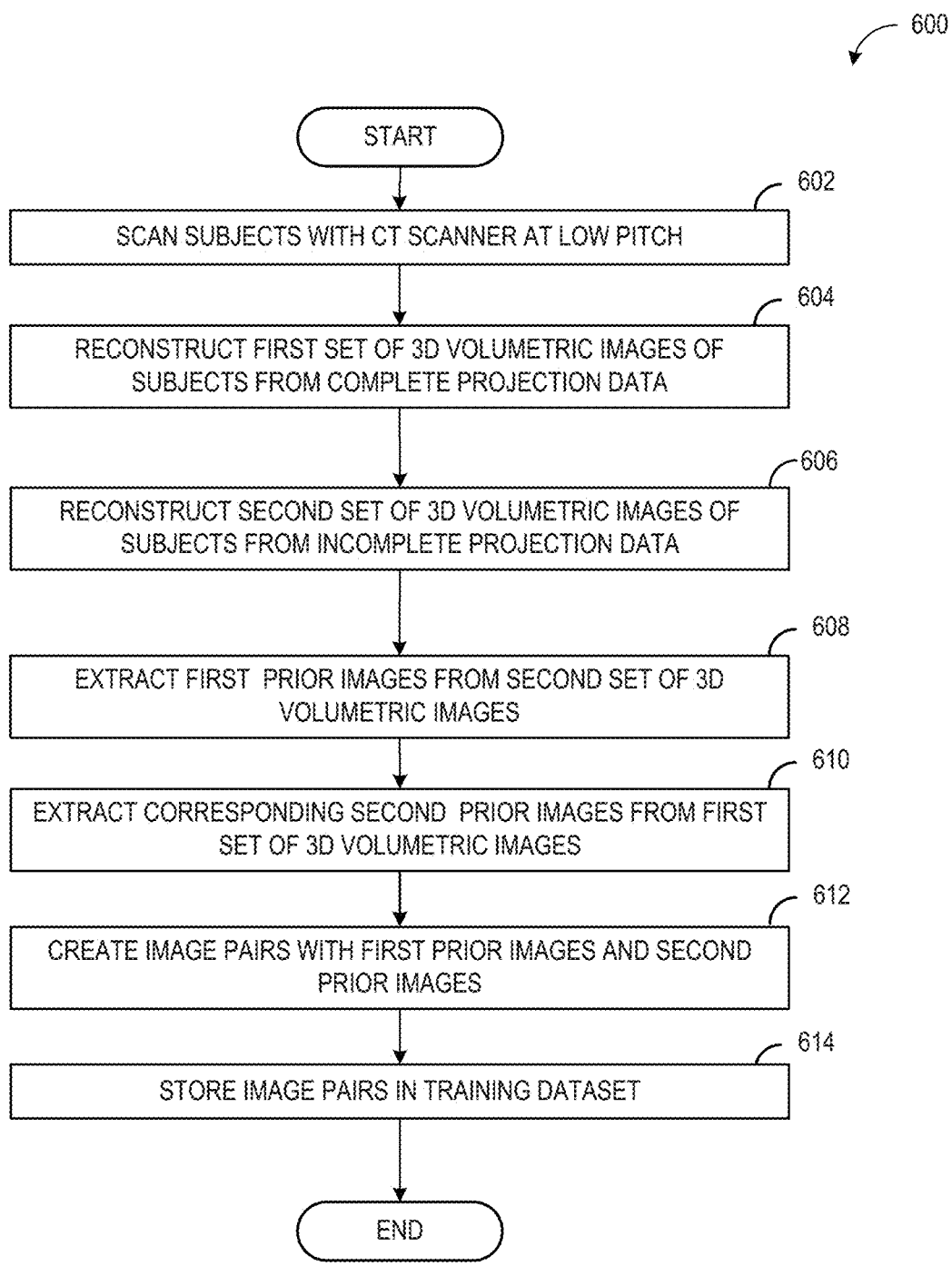
FIG. 6 shows a flowchart of an exemplary method for generating training data for the helical pitch mapping training system of FIG. 3.

Referring now to FIG. 6, a flowchart of a method 600 is shown for generating training data for training a multidimensional statistical regression model (such as the multidimensional statistical regression model 302 of the helical pitch mapping system 300 of FIG. 3), according to an exemplary embodiment, wherein the training data comprises a set of image pairs. Method 600 may be implemented as part of the helical pitch mapping training system 400 of FIG. 4. In an embodiment, some operations of method 600 may be stored in non-transitory memory and executed by a processor, such as non-transitory memory 306 and processor 304 of helical pitch mapping system 302 of FIG. 3. In some embodiments, the image pairs may be stored in the model training module 310 of helical pitch mapping system 302 of FIG. 3. Method 600 describes an exemplary procedure for generating training data from a single subject, which may be replicated across a sample population, as described above in reference to method 500 of FIG. 5.

Method 600 begins at 602, where method 600 includes scanning an ROI of a subject with a CT scanner at a low helical pitch (e.g., a pitch of 1.0). In one embodiment, the CT scanner is a 64 slice MDCT scanner (e.g., the 64 slice CT scanner of the multidimensional statistical regression model training system 400 of FIG. 4), with a collimator including 64 detector rows. In other embodiments, the CT scanner is a scanner with a different number of detector rows. For example, the CT scanner may be a 128 slice scanner with a collimator including 128 detector rows, or the CT scanner may be a 32 slice scanner with a collimator including 32 detector rows.

The ROI may be a heart of the subject, or a brain of the subject, or another organ or anatomical body of the subject. The subject may be positioned on a table of the 64 slice CT scanner, such that the table may be moved through a gantry of the 64 slice CT scanner during a scan to acquire x-ray projection data of the ROI as an x-ray source and a corresponding x-ray detector (e.g., the x-ray source 104 and the detector array 108 of FIG. 2, respectively) rotate 360° within the gantry. A helical pitch of the scan may be 1, where a complete set of projection data (e.g., using all 64 detector rows of the 64 slice CT scanner) is acquired to image the ROI.

At 604, method 600 includes reconstructing a first set of 3D volumetric images of the subjects in the sample groups from complete projection data acquired at 602. The first set of 3D volumetric images may be reconstructed from CT scan raw projection data using standard image reconstruction techniques. For example, the first set of 3D volumetric images may be reconstructed using filtered backprojection (FBP), or iterative reconstruction, or via a deep-learning image reconstruction method with estimated data used to fill in missing data (e.g., using a different regression model). In one embodiment, the 3D Feldkamp, Davis, and Kress (FDK) algorithm adapted for helical trajectories is used to reconstruct the image volumes, where a 3D cone beam reconstruction problem is converted into a plurality of 2D fan beam reconstruction problems.

At 606, method 600 includes reconstructing a second 3D volumetric image with incomplete projection data. In other words, two different 3D volumetric images may be generated, one reconstructed from a complete set of projection data (e.g., from all 64 detector rows, acquired at a helical pitch of 1.0), and one reconstructed from an incomplete or partial set of projection data (e.g., from a lesser number of detector rows, to approximate a helical pitch greater than 1.0). In one example, projection data from 32 of the 64 detector rows may be discarded, and the incomplete or partial set of projection data may include projection data from a remaining 32 of the 64 detector rows. In another example, the incomplete projection data may be generated from the complete projection data by discarding views of the complete projection data. For example, the incomplete projection data may be based on a 180° range of view angle data, rather than a larger angle range of 180° plus a fan angle range of view angle data of the complete projection data, where the fan angle range is an angular spread of x-rays emitted by the x-ray source. In still another example, the incomplete projection data may be generated by scanning the same subjects with the 64 slice CT scanner set with a helical pitch of 2, or with a second, 32 slice CT scanner with 32 detector rows. It should be appreciated that the examples provided herein are for illustrative purposes, and the incomplete or partial set of projection data may be generated a different way without departing from the scope of this disclosure.

At 608, method 600 includes extracting a set of first prior images from the second set of 3D volumetric images (e.g., reconstructed from incomplete projection data). In one example, the set of first prior images are extracted by proceeding incrementally through one dimension of each 3D volumetric image of the second set of 3D volumetric images, from a first extent of the 3D volumetric image to a second extent of the 3D volumetric image. For example, the set of first prior images may comprise 2D images in an x, y plane of the 3D volumetric image, where a first 2D image is extracted from the 3D volumetric image at a first z-location; a second 2D image is extracted from the 3D volumetric image at a second z-location; a third 2D image is extracted from the 3D volumetric image at a third z-location; and so on. As described earlier, the x, y plane may be a horizontal plane, a sagittal plane, or a coronal plane of the 3D volumetric image.

At 610, method 600 includes extracting a corresponding set of second prior images from the first set of 3D volumetric images, where the set of first prior images and the set of second prior images share the same z-location. In other words, the second prior images may be extracted following the procedure described at 608, but while the first prior images are generated from incomplete projection data of the second set of 3D volumetric images, the second prior images are generated from complete projection data of the first set of 3D volumetric images. Each first prior image may be paired with a corresponding second prior image, where the corresponding second prior image has the same z-location as the first prior image. In this way, corresponding sets of first prior images and second prior images may be generated from corresponding 3D volumetric images of the second set of 3D volumetric images and the first set of 3D volumetric images, respectively.

At 612, method 600 includes creating image pairs with the set of first prior images and the set of second prior images. Since the set of first prior images is generated from the limited view projection data of the second set of 3D volumetric images, the set of first prior images may be used as input images during training of the multidimensional statistical regression model. As the set of second prior images is generated from the complete projection data of the first set of 3D volumetric images, where the first of 3D volumetric images corresponds to the second set of 3D volumetric images, the set of second prior images may be used as corresponding target images or ground truth images during training of the multidimensional statistical regression model. At 616, method 600 includes storing the image pairs in a training dataset, and method 600 ends.

Figure 7:
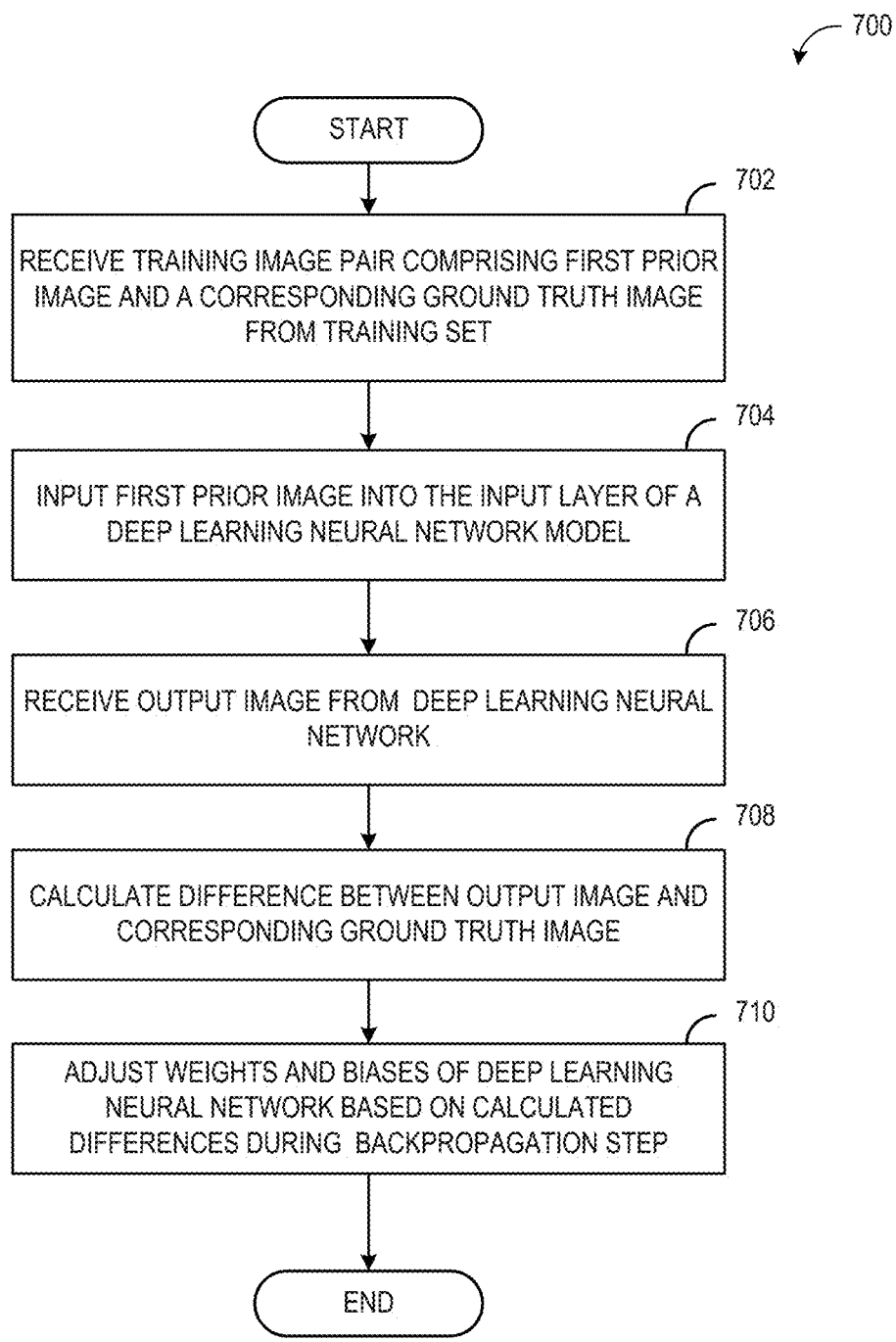
FIG. 7 shows a flowchart of an exemplary method for training a deep learning neural network model within the helical pitch mapping training system of FIG. 3.

Referring now to FIG. 7, a flowchart of an exemplary method 700 for training a multidimensional statistical regression model (such as the multidimensional statistical regression model 402 of the multidimensional statistical regression model training system 400 of FIG. 4). In an embodiment, the multidimensional statistical regression model may be a deep learning neural network model with a plurality of hidden layers. In an embodiment, the deep learning neural network model may comprise a convolutional neural network, although the examples provided herein are for illustrative purposes and that any type of neural network may be used by method 700 without departing from the scope of this disclosure.

The training data used in method 700 may include a set of image pairs comprising a first prior image of an ROI of a subject reconstructed from interpolated projection data, and a corresponding ground truth image of the ROI of the subject reconstructed from real projection data, where the interpolated and real projection data are selected and stored in accordance with the procedure described above in reference to method 600 of FIG. 6. Method 700 may be implemented as part of the multidimensional statistical regression model training system 400 of FIG. 4 and/or the helical pitch mapping system 302 of FIG. 3. In an embodiment, one or more operations of method 700 may be stored in non-transitory memory and executed by a processor, such as the non-transitory memory 306 and processor 304 of helical pitch mapping system 302 of FIG. 3.

Method 700 begins at operation 702, where method 700 includes receiving a training image pair comprising a first prior image and a ground truth image (e.g., a target image) from a training set. In an embodiment, the training set may be stored in a training module of a helical pitch mapping system, such as the model training module 310 of helical pitch mapping system 302 of FIG. 3.

At 704, method 700 includes inputting the first prior image of the training image pair into an input layer of the deep learning neural network. In some embodiments, each pixel intensity value of the input image may input into a distinct neuron of the input layer of the deep learning neural network.

At 706, method 700 includes receiving an output image from the deep learning neural network. The deep learning neural network maps the first prior image to the output image by propagating the first prior image from the input layer, through one or more hidden layers, until reaching an output layer of the deep learning neural network. In some embodiments, the output of the deep learning neural network comprises a 2D matrix of values, wherein each value corresponds to a distinct intensity of a pixel of the input image, and wherein a distinct intensity of each pixel of the output image generates a reconstruction of the input image where a resolution of one or more regions of the output image exceed the resolution of the one or more regions of the input image.

At 708, method 700 includes calculating a difference between the output image of the deep learning neural network and the target image of the training image pair. A loss function or error function may be used to minimize the difference between the output image of the deep learning neural network and the target image of the training image pair (e.g. the ground truth image). In one embodiment, the error function may be a per-pixel loss function, where differences between the output image and the target image are compared on a pixel-by-pixel basis and summed. In another embodiment, the error function may be a root mean squared error (RSME) function, where loss is defined by a mean of the squared errors between all the pixels. In yet another embodiment, the error function may be based on a structure similarity image quality index (SSIM), where individual SSIMs may be calculated for different ROIs of the training image pair and averaged to produce a total error. In still other embodiments, the loss function may be a minimax loss function, or a Wasserstein loss function. It should be appreciated that the examples provided herein are for illustrative purposes, and other types of loss functions may be used without departing from the scope of this disclosure.

At 710, the weights and biases of the deep learning neural network are adjusted based on the difference between the output image and the ground truth image from the relevant training image pair. The difference (or loss), as determined by the loss function, may be back-propagated through the deep learning neural network to update the weights (and biases) of the convolutional layers. In some embodiments, back propagation of the loss may occur according to a gradient descent algorithm, wherein a gradient of the loss function (a first derivative, or approximation of the first derivative) is determined for each weight and bias of the deep learning neural network. Each weight (and bias) of the deep learning neural network is then updated by adding the negative of the product of the gradient determined (or approximated) for the weight (or bias) with a predetermined step size. Method 700 may then end. It will be noted that method 700 may be repeated until the weights and biases of the deep learning neural network converge, or the rate of change of the weights and/or biases of the deep neural network for each iteration of method 700 are under a threshold.

While not described in method 700, it should be appreciated that in order to avoid overfitting, training of the deep learning neural network may be periodically interrupted to validate a performance of the deep learning neural network on a test set comprising test image pairs. In one example, the test image pairs may be generated as described above in reference to the multidimensional statistical regression model training system 400 of FIG. 4, and may be taken at random from a larger training dataset. In an embodiment, training of the deep learning neural network may end when the performance of the deep learning neural network on the test image pairs converges (e.g., when an error rate on the test set converges on a minimum value). In this way, method 700 enables a deep learning neural network to be trained to map a first image reconstructed based on interpolated projection data to a second image reconstructed based on real projection data.

Figure 8:
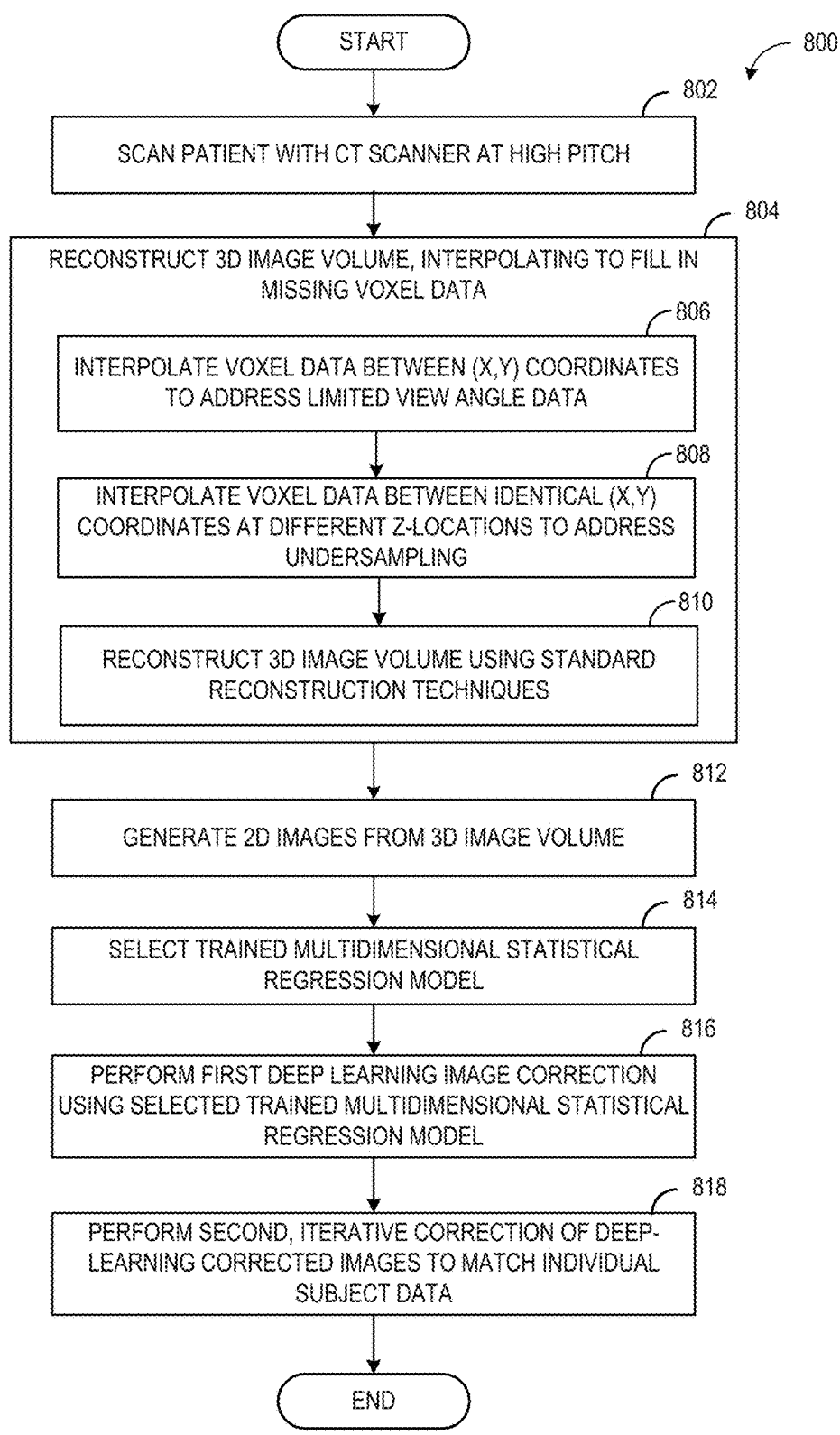
FIG. 8 shows a flowchart of an exemplary method for applying a trained deep learning neural network model to map high helical pitch images to low helical pitch images.

Referring now to FIG. 8, a flowchart is shown of a method 800 for generating a high quality CT image (e.g., having a quality associated with low helical pitch data) from a low quality CT image (e.g., reconstructed from high helical pitch data). Method 800 may be executed within an imaging system such as the imaging system 200 of FIG. 2, including a helical pitch mapping system such as the helical pitch mapping system 302 of FIG. 3. During an operating mode of the imaging system, a trained multidimensional statistical regression model (such as the multidimensional statistical regression model 308 of the helical pitch mapping system 302 of FIG. 3) may be deployed to generate the high quality CT image from the low quality CT image. In an embodiment, the trained multidimensional statistical regression model may be a deep neural network with a plurality of hidden layers, such as a convolutional neural network, that is trained on a training dataset generated in accordance with the procedure described in method 600 of FIG. 6. Method 800 may be implemented as part of the multidimensional statistical regression model training system 400 of FIG. 4. In an embodiment, one or more operations of method 800 may be stored as executable instructions in non-transitory memory (e.g., non-transitory memory 306 of FIG. 3) and executed by a processor such as the processor 304 of FIG. 3. Further, method 800 may be deployed as part of an inference module such as the inference module 312 of helical pitch mapping system 302 of FIG. 3, and/or the inference module 422 of the multidimensional statistical regression model training system 400 of FIG. 4.

Method 800 begins at 802, where method 800 includes scanning an ROI of a patient with a CT scanner at a high helical pitch (e.g., a pitch greater than 1.5, such as 2.0). As a result of scanning at the high helical pitch, the CT scanner may generate incomplete projection data, while the multidimensional statistical regression model may be trained on complete projection data. In one example, the multidimensional statistical regression model is trained using complete projection data acquired from a 64 slice CT scanner, and the CT scanner that generates the incomplete projection data is a 32 slice CT scanner, or a 16 slice CT scanner, or another type of scanner. For example, a clinic may use a 16 slice CT scanner for imaging patients of the clinic due to a reduced cost of the 16 slice CT scanner in relation to the 64 slice CT scanner, or due to an operational goal of reducing a scan duration and a corresponding exposure of the patient to radiation, or for another reason. In one embodiment, the CT scanner is a 32 slice CT scanner. In another example, the CT scanner is a 64 slice CT scanner, where the incomplete projection data is generated as a result of a high helical pitch setting of the 64 slice CT scanner. In general, the CT scanner may be any scanner, provided that the amount of projection data acquired by the CT scanner is less than an amount of target projection data used to train the multidimensional statistical regression model.

At 804, method 800 includes reconstructing a 3D image volume from the projection data acquired by the CT scanner at 802. However, as described above, artifacts may be introduced into the 3D image volume due to limited view angle projection data and undersampling of projection data in a z-direction. To reduce a number of the artifacts, one or more data augmentation techniques may be carried out prior to and/or as part of image reconstruction, whereby reconstructing the 3D image volume may include performing interpolations and/or extrapolations to fill in missing projection data.

At 806, performing interpolations and/or extrapolations to fill in missing projection data includes interpolating voxel data in each reconstruction plane of the 3D image volume to address potential incomplete or limited view angle data due to the high helical pitch. For example, at each z-location of the 3D image volume, a reconstruction plane may be defined by (x,y) coordinates at the z-location, where interpolating voxel data in the reconstruction plane includes interpolating between different sets of the (x, y) coordinates. By interpolating the voxel data within each reconstruction plane, a sufficiency of view angle data for image reconstruction may be achieved.

At 808, performing interpolations and/or extrapolations to fill in missing projection data includes interpolating voxel data between same (x,y) coordinates at different z-locations, to address a potential undersampling of projection data in the z-direction. As described above, as helical pitch increases, there may be gaps in projection data between each helical rotation performed by an x-ray source of the imaging system. In order to have sufficient projection data to adequately reconstruct the 3D image volume, data interpolations and/or extrapolations may be performed in the z-direction to fill in the gaps. To clarify, each data point acquired during a first full rotation of the x-ray source has a different z-location, due to a helical nature of the scan. Therefore, to reconstruct image voxel data across each slice, data interpolations are performed at each z-location to ensure data sufficiency for the image voxel. The data interpolations are performed between measured data with the same (x,y) coordinates in the reconstruction plane at a given z-location.

At 810, method 800 includes reconstructing the 3D image volume using standard reconstruction techniques. As described above in reference to the training method 600 of FIG. 6, the first set of 3D volumetric images may be reconstructed using filtered backprojection (FBP), or iterative reconstruction, or via a deep-learning image reconstruction method with estimated data used to fill in missing data. In one embodiment, the 3D Feldkamp, Davis, and Kress (FDK) algorithm adapted for helical trajectories is used to reconstruct the image volumes, where a 3D cone beam reconstruction problem is converted into a plurality of 2D fan beam reconstruction problems.

At 812, method 800 includes generating a plurality of 2D CT images from the 3D image volume, as described above in reference to method 600 of FIG. 6. The plurality of 2D CT images may be generated from reconstruction planes in the horizontal, sagittal, or coronal orientation, and may span the entire 3D image volume, or may cover a portion of the entire 3D image volume without spanning the entire 3D image volume.

At 814, method 800 includes selecting a trained multidimensional statistical regression model for processing the 2D CT images. As described above in reference to FIG. 3, the helical pitch mapping system may include a plurality of different multidimensional statistical regression models. The plurality of different multidimensional statistical regression models may include deep learning neural network models and/or other types of statistical regression models, which may be trained on different sample groups. For example, a first trained multidimensional statistical regression model may be selected for processing 2D CT images of a first subject with a high similarity to a first sample group, while a second trained multidimensional statistical regression model may be selected for processing 2D CT images of a second subject with a high similarity to a second sample group.

In some embodiments, different multidimensional statistical regression models may be trained for different helical pitches (e.g., different degrees of incomplete data). For example, a first multidimensional statistical regression model may be trained to map images reconstructed from interpolated projection data acquired with a helical pitch of 2 to an image reconstructed from projection data acquired with a helical pitch of 1.0; a second multidimensional statistical regression model may be trained to map images reconstructed from interpolated projection data acquired with a helical pitch of 1.5 to an image reconstructed from projection data acquired with a helical pitch of 1.0; a third multidimensional statistical regression model may be trained to map images reconstructed from interpolated projection data acquired with a helical pitch of 2.5 to an image reconstructed from projection data acquired with a helical pitch of 1.0; and so on. In one example, the selected multidimensional statistical regression model is a model that matches a helical pitch of a relevant CT scan. For example, if the helical pitch of a CT scan is 2.0, the selected multidimensional statistical regression model may be a model trained to map images reconstructed from interpolated projection data acquired with a helical pitch of 2.0 to an image reconstructed from projection data acquired with a helical pitch of 1.0, rather than a model trained to map images reconstructed from interpolated projection data acquired with a different helical pitch to an image reconstructed from projection data acquired with a helical pitch of 1.0.

Additionally, the plurality of different multidimensional statistical regression models may include models for different body types. For example, a first multidimensional statistical regression model may be selected for an adult, a second multidimensional statistical regression model may be selected for a child, and a third multidimensional statistical regression model may be selected for an infant. Further, different multidimensional statistical regression models may be developed for adults with different body types (e.g., one model for thin adults and a different model for obese adults, etc.).

At 816, method 800 includes performing a first deep learning image correction on the 2D CT images using the selected trained multidimensional statistical regression model. As described above, performing the deep learning image correction may include generating a set of output images of a quality associated with a low helical pitch (e.g., 1.0) from the 2D CT images reconstructed from projection data with high helical pitch (e.g., 2.0). In other words, the set of output images may have an appearance of being images reconstructed from actual projection data acquired from a CT scanner during a scan with low helical pitch (e.g., with a reduced number of artifacts, noise, and/or an improved resolution).

At 818, method 800 includes performing a second, iterative correction of the deep learning corrected images generated at 816 (e.g., the set of output images) to match individual subject data. In some cases, the set of deep learning corrected images generated by the trained multidimensional statistical regression model may not include, or may obscure information of the 2D CT images generated from the 3D image volume. For example, noise texture or image details may be incorrectly reconstructed by the trained multidimensional statistical regression model, whereby elements of the deep learning corrected images may be missing, or blurred, or washed out. Alternatively, artifacts (e.g. streaks, etc.) may be introduced, which may make it harder to view features of the deep learning corrected images. To ensure that the deep learning corrected images include subject-specific features of the original 2D CT images of the subject and to reduce a number of artifacts introduced, a second, iterative correction procedure is carried out to ensure that the subject-specific features are included in a set of final CT images generated by the second, iterative correction procedure. As a result of carrying out the second, iterative correction procedure, the set of final CT images may be of a higher quality than the original 2D CT images, without eliminating or obscuring the subject-specific features of the high helical pitch CT images 426.

In one example, the second, iterative correction procedure may be an iterative procedure based on a Prior Image Constrained Compressed Sensing (PICCS) method. In accordance with the PICCS method, a transformation operation is performed to create a sparser version of an output image. The sparser version of the output image is then reconstructed, and an inverse transformation may be subsequently performed to transform the sparser version of the output image back to the original output image. An advantage of reconstructing a sparser version of the output image is that streaking artifacts may be reduced. In other words, image reconstruction of the sparser version of the output image is constrained by a corresponding original high helical pitch image, where a similarity between the high helical pitch image and output image may be used to effectively mitigate low frequency shading artifacts. In one example, the sparser version of the output image may be created via a subtraction operation, where pixel data of the output image is subtracted from a corresponding original high helical pitch image.

Thus, a 3-step procedure is provided to improve a quality of CT images reconstructed from high helical pitch data, where the improved CT images exhibit have a comparable quality to CT images reconstructed from low helical pitch data in terms of a presence of artifacts, a level of noise, and/or other quality metrics. In a first step of the 3-step procedure, data interpolation is carried out to fill in missing projection data both within a set of reconstruction planes and between reconstruction planes of the set of reconstruction planes, and images are reconstructed using standard reconstruction techniques. In a second step of the 3-step procedure, the reconstructed images are inputted into a trained multidimensional statistical regression model, which performs a first correction of the reconstructed images. In a third step of the 3-step procedure, the corrected reconstructed images undergo a second, iterative correction procedure to ensure that relevant patient-specific data of the new set of images (e.g., a growth, bulge, tumor, abnormality, etc.) is correctly displayed in a set of final images.

Methods and systems are further provided to train the multidimensional statistical regression model (e.g., a high dimensional statistical regression model) to map a first CT image to a second CT image, where the first CT image is of a lower quality, and the second CT image is of a higher quality (e.g., as a result of the multidimensional statistical regression model being trained using target projection data acquired at a low helical pitch). The first CT image may be of a lower quality due to being reconstructed from less projection data than the second CT image (e.g., limited view projection data vs. full view projection data, or undersampling in a z-direction). For example, the first CT image may be of a lower quality due to being reconstructed from projection data acquired at a higher helical pitch than the second CT image, or the first CT image may be of a lower quality due to being reconstructed from projection data acquired from a lower-slice CT scanner than the second CT image.

A benefit of the 3-step procedure is that a quality of CT images produced by a lower-cost, lower slice CT scanner may approximate a quality of CT images produced by a higher-cost, higher slice CT scanner. As a result of achieving a desired image quality on a lower-cost, lower slice CT scanner, an amount of money spent by a clinic on a CT scanner may be reduced. Additionally, a duration of a scan may be reduced, thereby allowing an increased number of scans to be scheduled and increasing an efficiency of resource allocation, while reducing a consequent amount of radiation exposure of the subject during the scan.

A technical effect of employing the 3-step procedure is that a quality of a CT image may be increased to a quality associated with a more costly CT scanner or a longer scan.

The disclosure also provides support for a method, comprising: generating a first computed tomography (CT) image from projection data acquired at a first helical pitch, using a trained multidimensional statistical regression model to generate a second CT image from the first CT image, the multidimensional statistical regression model trained with a plurality of target CT images reconstructed from projection data acquired at a second helical pitch, the second helical pitch less than the first helical pitch, performing an iterative correction of the second CT image to generate a final CT image. In a first example of the method, the method further comprises: generating the first CT image from projection data acquired at the first helical pitch by interpolating and extrapolating missing data points of the projection data and reconstructing the first CT image based on one of filtered backprojection reconstruction, iterative reconstruction, and deep-learning image reconstruction. In a second example of the method, optionally including the first example, the first CT image is reconstructed from incomplete projection data acquired from a CT scan with a pitch of 2.0, and wherein the plurality of target CT images are reconstructed from complete projection data acquired from CT scans with a pitch of 1.0. In a third example of the method, optionally including one or both of the first and second examples, the plurality of target CT images is acquired from a plurality of subjects that are categorized into a plurality of sample groups prior to training the multidimensional statistical regression model, and a different training dataset is created for each sample group of the plurality of sample groups. In a fourth example of the method, optionally including one or more or each of the first through third examples, the plurality of subjects are categorized into the plurality of sample groups based on a size of a subject of the plurality of subjects. In a fifth example of the method, optionally including one or more or each of the first through fourth examples, the trained multidimensional statistical regression model is a neural network. In a sixth example of the method, optionally including one or more or each of the first through fifth examples, the neural network is a convolutional neural network. In a seventh example of the method, optionally including one or more or each of the first through sixth examples, the neural network is trained with a training dataset comprising a plurality of image pairs, wherein each of the plurality of image pairs includes a respective one of the plurality of target CT images and a corresponding input CT image, each respective one of the plurality of target CT images reconstructed from a respective low pitch projection dataset acquired at the second helical pitch and each corresponding input CT image reconstructed from a pseudo high pitch dataset that includes half of the projection data from the respective low pitch projection dataset. In an eighth example of the method, optionally including one or more or each of the first through seventh examples, each of the plurality of image pairs includes a first training image reconstructed from data points of a reconstruction plane of a first 3D volume of a region of interest (ROI), and a second training image is reconstructed from an identical reconstruction plane of a second 3D volume of the ROI, where the second 3D volume of the ROI includes twice as much projection data as the first 3D volume of the ROI. In a ninth example of the method, optionally including one or more or each of the first through eighth examples, the reconstruction plane is one of a horizontal reconstruction plane, a sagittal reconstruction plane, and a coronal reconstruction plane. In a tenth example of the method, optionally including one or more or each of the first through ninth examples, the multidimensional statistical regression model performs an additional non-rigid registration that further refines the iterative correction of the second CT image. In a eleventh example of the method, optionally including one or more or each of the first through tenth examples, performing the iterative correction of the second CT image further comprises adjusting the second CT image to include features of the first CT image specific to a subject of the second CT image. In a twelfth example of the method, optionally including one or more or each of the first through eleventh examples, the second CT image is adjusted to include features of the first CT image using a Prior Image Constrained Compressed Sensing (PICCS) method.

The disclosure also provides support for a method, comprising: obtaining a first computed tomography (CT) image, the first CT image reconstructed from a high pitch dataset, inputting the first CT image to a trained multidimensional statistical regression model trained to output a second CT image based on the first CT image, the trained multidimensional statistical regression model trained to map the first CT image to the second CT image using a training dataset that includes a plurality of training CT image pairs, each training CT image pair including a first training CT image reconstructed from a low pitch dataset and a second training CT image reconstructed from a pseudo high pitch dataset generated from the low pitch dataset, iteratively correcting the second CT image based on the first CT image to generate a final CT image, and storing the final CT image and/or outputting the final CT image for display. In a first example of the method, the low pitch dataset includes projection data generated by scanning a subject with a collimator of a 64 slice CT scanner, the collimator having 64 detector rows, and the pseudo high pitch dataset includes projection data of the low pitch dataset generated from 32 detector rows of the 64 detector rows of the collimator. In a second example of the method, optionally including the first example, the high pitch dataset is acquired by scanning a subject with a 32 slice CT scanner. In a third example of the method, optionally including one or both of the first and second examples, the first CT image reconstructed from the high pitch dataset is a 2D CT image extracted from a 3D image volume reconstructed from the high pitch dataset.

The disclosure also provides support for an image processing system comprising: a display device, a user input device, a trained multi-dimensional statistical regression model, a processor communicably coupled to the display device, the user input device, and a non-transitory memory storing the trained multidimensional statistical regression model and including instructions that when executed cause the processor to: in a first step, reconstruct a first computed tomography (CT) image of a region of interest (ROI) of a subject from high helical pitch projection data, using interpolated data to fill in missing projection data of the high helical pitch projection data, in a second step, generate a second CT image using the trained multidimensional statistical regression model, the second image of higher quality than the first image, in a third step, iteratively correct the second image based on the first image, and display the second image via the display device, and wherein the trained multidimensional statistical regression model has a neural network architecture. In a first example of the system, the high helical pitch projection data is acquired via a CT scanner communicatively coupled to the image processing system. In a second example of the system, optionally including the first example, the trained multidimensional statistical regression model is trained with one or more training sets, wherein each one of the one or more training sets comprises a plurality of image pairs of the ROI from a plurality of subjects, each of the plurality of image pairs including a target CT image reconstructed from a low helical pitch dataset, and an input CT image reconstructed from a subset of the low pitch dataset, the subset including half of an amount of data of the low pitch dataset.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method, comprising:
generating a first computed tomography (CT) image from projection data acquired at a first helical pitch;
using a trained multidimensional statistical regression model to generate a second CT image from the first CT image, the multidimensional statistical regression model trained with a plurality of target CT images reconstructed from projection data acquired at a second helical pitch, the second helical pitch less than the first helical pitch;
performing an iterative correction of the second CT image to generate a final CT image.

2. The method of claim 1, further comprising generating the first CT image from projection data acquired at the first helical pitch by interpolating and extrapolating missing data points of the projection data and reconstructing the first CT image based on one of filtered backprojection reconstruction, iterative reconstruction, and deep-learning image reconstruction.

3. The method of claim 1, wherein the first CT image is reconstructed from incomplete projection data acquired from a CT scan with a pitch of 2.0, and wherein the plurality of target CT images are reconstructed from complete projection data acquired from CT scans with a pitch of 1.0.

4. The method of claim 1, wherein the plurality of target CT images is acquired from a plurality of subjects that are categorized into a plurality of sample groups prior to training the multidimensional statistical regression model, and a different training dataset is created for each sample group of the plurality of sample groups.

5. The method of claim 4, wherein the plurality of subjects are categorized into the plurality of sample groups based on a size of a subject of the plurality of subjects.

6. The method of claim 1, wherein the trained multidimensional statistical regression model is a neural network.

7. The method of claim 6, wherein the neural network is a convolutional neural network.

8. The method of claim 6, wherein the neural network is trained with a training dataset comprising a plurality of image pairs, wherein each of the plurality of image pairs includes a respective one of the plurality of target CT images and a corresponding input CT image, each respective one of the plurality of target CT images reconstructed from a respective low helical pitch projection dataset acquired at the second helical pitch and each corresponding input CT image reconstructed from a pseudo high helical pitch dataset that includes half of the projection data from the respective low helical pitch projection dataset.

9. The method of claim 8, wherein each of the plurality of image pairs includes a first training image reconstructed from data points of a reconstruction plane of a first 3D volume of a region of interest (ROI), and a second training image is reconstructed from an identical reconstruction plane of a second 3D volume of the ROI, where the second 3D volume of the ROI includes twice as much projection data as the first 3D volume of the ROI.

10. The method of claim 9, wherein the reconstruction plane is one of a horizontal reconstruction plane, a sagittal reconstruction plane, and a coronal reconstruction plane.

11. The method of claim 1, wherein the multidimensional statistical regression model performs an additional non-rigid registration that further refines the iterative correction of the second CT image.

12. The method of claim 1, wherein performing the iterative correction of the second CT image further comprises adjusting the second CT image to include features of the first CT image specific to a subject of the second CT image.

13. The method of claim 12, wherein the second CT image is adjusted to include features of the first CT image using a Prior Image Constrained Compressed Sensing (PICCS) method.

14. A method, comprising:
obtaining a first computed tomography (CT) image, the first CT image reconstructed from a high helical pitch dataset;
inputting the first CT image to a trained multidimensional statistical regression model trained to output a second CT image based on the first CT image, the trained multidimensional statistical regression model trained to map the first CT image to the second CT image using a training dataset that includes a plurality of training CT image pairs, each training CT image pair including a first training CT image reconstructed from a low helical pitch dataset and a second training CT image reconstructed from a pseudo high helical pitch dataset generated from the low helical pitch dataset;
iteratively correcting the second CT image based on the first CT image to generate a final CT image; and
storing the final CT image and/or outputting the final CT image for display.

15. The method of claim 14, wherein the low helical pitch dataset includes projection data generated by scanning a subject with a collimator of a 64 slice CT scanner, the collimator having 64 detector rows, and the pseudo high helical pitch dataset includes projection data of the low helical pitch dataset generated from 32 detector rows of the 64 detector rows of the collimator.

16. The method of claim 14, wherein the high helical pitch dataset is acquired by scanning a subject with a 32 slice CT scanner.

17. The method of claim 14, wherein the first CT image reconstructed from the high helical pitch dataset is a 2D CT image extracted from a 3D image volume reconstructed from the high helical pitch dataset.

18. An image processing system comprising:
a display device;
a user input device;
a trained multi-dimensional statistical regression model;
a processor communicably coupled to the display device, the user input device, and a non-transitory memory storing the trained multidimensional statistical regression model and including instructions that when executed cause the processor to:
- in a first step, reconstruct a first computed tomography (CT) image of a region of interest (ROI) of a subject from high helical pitch projection data, using interpolated data to fill in missing projection data of the high helical pitch projection data;
- in a second step, generate a second CT image using the trained multidimensional statistical regression model, the second CT image of higher quality than the first CT image;
- in a third step, iteratively correct the second CT image based on the first CT image; and
- display the second CT image via the display device; and wherein the trained multidimensional statistical regression model has a neural network architecture.

19. The image processing system of claim 18, wherein the high helical pitch projection data is acquired via a CT scanner communicatively coupled to the image processing system.

20. The image processing system of claim 18, wherein the trained multidimensional statistical regression model is trained with one or more training sets, wherein each one of the one or more training sets comprises a plurality of image pairs of the ROI from a plurality of subjects, each of the plurality of image pairs including a target CT image reconstructed from a low helical pitch dataset, and an input CT image reconstructed from a subset of the low helical pitch dataset, the subset including half of an amount of data of the low helical pitch dataset.

* * * * *